United States Patent
Zur et al.

(10) Patent No.: US 9,374,315 B2
(45) Date of Patent: Jun. 21, 2016

(54) SPARE RESOURCE ELECTION IN A COMPUTING SYSTEM

(71) Applicant: NICE-SYSTEMS LTD., Ra'anana (IL)

(72) Inventors: Tal Zur, Rishon-Lezion (IL); Efim Kolodizner, Ashdod (IL)

(73) Assignee: NICE-SYSTEMS LTD., Ra'anana (IL)

( * ) Notice: Subject to any disclaimer, the term of this patent is extended or adjusted under 35 U.S.C. 154(b) by 214 days.

(21) Appl. No.: 14/250,852

(22) Filed: Apr. 11, 2014

(65) Prior Publication Data

US 2015/0295850 A1 Oct. 15, 2015

(51) Int. Cl.
*G06F 15/173* (2006.01)
*H04L 12/911* (2013.01)
*H04L 1/22* (2006.01)

(52) U.S. Cl.
CPC ............... *H04L 47/783* (2013.01); *H04L 1/22* (2013.01)

(58) Field of Classification Search
CPC ................................ H04L 47/783; H04L 1/22
USPC .......................................................... 709/225
See application file for complete search history.

(56) References Cited

U.S. PATENT DOCUMENTS

| | | | | |
|---|---|---|---|---|
| 7,673,027 B2* | 3/2010 | Janakiraman | ............. | G06F 8/20 709/217 |
| 8,214,533 B2* | 7/2012 | Nishi | ...................... | H04L 12/46 709/223 |
| 2006/0203718 A1* | 9/2006 | Benhase | ............. | G06F 11/2058 370/220 |
| 2012/0057453 A1* | 3/2012 | Xie | ......................... | H04L 69/40 370/219 |
| 2012/0239804 A1* | 9/2012 | Liu | ......................... | H04L 47/34 709/224 |
| 2015/0100694 A1* | 4/2015 | Sohail | ................. | H04L 47/6265 709/226 |

* cited by examiner

*Primary Examiner* — Mohamed Wasel
(74) *Attorney, Agent, or Firm* — Pearl Cohen Zedek Latzer Baratz LLP (57) ABSTRACT

A computing system comprising multiple computing resources in which one resource assumes spare status using a spare election algorithm. According to the algorithm each computing resource on initialization requests permission to assume spare state from the other computing resources. Then if all of the other computing resources grant the permission the requesting computing resource assumes spare state. If one of the other computing resources does not grant the permission to the requesting resource then the requesting resource assumes normal state.

11 Claims, 8 Drawing Sheets

SPARE RESOURCE ELECTION IN A COMPUTING SYSTEM

FIELD OF THE INVENTION

The present invention relates generally to the provision of redundancy in a computing system in which a resource which may be termed a "spare" is provided as back up for one or more other resources.

BACKGROUND

The invention is particularly useful in, but not limited to, recording systems, e.g. systems for recording digital information. A recording system is described below as one example of the background of this invention.

In a recording system including multiple recording devices it is advantageous to include a device that acts as a spare to be used in the event that one of the other devices is not available for any reason such as failure of a device or the device being offline or unavailable due to some other cause. The spare device is extra or redundant, and thus may not be used during normal system operation, except in the event that another device is not available, in which case it is no longer spare. One option to support this redundancy is a so-called N+1 schema. In such a schema there is one device that backs up all of the other N recording devices. This device is designated as "spare" and the others are designated "normal", e.g. active. In this scenario "normal" means not spare, e.g., performing normal day-to-day operations associated with that device. A spare device is configured to take over the operations of another device if that device fails or is not available for any reason. A spare device may also be referred to as a "back up" device. The "normal" devices are configured to record certain incoming information and may also be referred to as "active, or "in use" or "operational".

The provision of a spare device in this way is not limited to recording systems. Other systems comprising multiple devices may benefit from the provision of a spare device to be used in the event that one device in the system is not available.

SUMMARY

Embodiments of the invention include a computing system comprising multiple computing resources. Each of the multiple computing resources may be configured to assume normal or spare state, for example after initialisation, by implementing a spare election process. In one example of a spare election process, each computing resource on initialisation requests permission to assume spare state from the other ones of the multiple computing resources, if all of the other ones of the multiple computing devices grant the permission the requesting computing resource assumes spare state, and if any of the other ones of the multiple computing resources does not grant the permission to the requesting resource then the requesting resource assumes normal state.

The term "resource" used herein may refer to a computing device, for example a recording device. It may also refer to a virtual device or virtual machine. Furthermore the term "resource" may encompass a running executable or an instance of code. Thus for example at least some of the multiple resources of a system according to the invention may operate on the same hardware. A resource is also sometimes referred to in the following as a node in a computing system. The foregoing are examples of resources and the invention is not limited to these examples.

Embodiments of the invention also include a method of operating a computing system comprising multiple computing resources. The method may comprise: configuring each of the multiple computing resources in the system to: send to each of the of the multiple computing resources other than the sending resource a request for permission to assume spare state, if all of the other ones of the multiple computing resources grant the permission, assume spare state, and if any of the other multiple computing resources does not grant the permission, assume normal state.

Embodiments of the invention also provide a method of resolving deadlock between multiple computing resources. A deadlock is a well-known phenomenon which occurs, for example, when two or more tasks permanently block each other by each task having a lock on a resource which the other tasks are trying to reach. In some known processes this is resolved with the result that one or more of the resources is a deadlock "victim" and is permanently locked out.

Embodiments of this invention provide a method of resolving deadlock between multiple computing resources comprising arranging a hierarchy among the resources. Then, in the event of a competition between resources, the higher one in the hierarchy takes precedence. In practice according to embodiments of the invention, a resource may receive a request from another resource. The receiving resource may examine the position of the requesting resource in the hierarchy and compare it to its own position. Depending on the result of the comparison the receiving resource may either respond to the request or defer responding until it has completed a process to which the request relates.

For example, each of two resources may request the other for the same service, e.g. permission to take spare status. The method may result in the higher one in the hierarchy receiving a response to the request before the lower one in the hierarchy responds to the higher one. Thus neither becomes a deadlock victim.

The hierarchy may be readily achieved using identities already given to the devices. For example certain kinds of devices have identities hard coded into memory.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the drawings.

DETAILED DESCRIPTION

In the following, embodiments of the invention are described with particular reference to a recording system as an example of a computing system comprising multiple resources, in this example computing devices. However, embodiments of the invention are applicable to any computing system in which a resource or device designated to be spare is provided as backup. Embodiments of the invention are particularly applicable to distributed computing systems. The term "distributed computing systems" is used herein to refer to systems comprising multiple computing resources in which at least some operations are shared between resources. The invention is not limited to such systems.

Figure 1A:
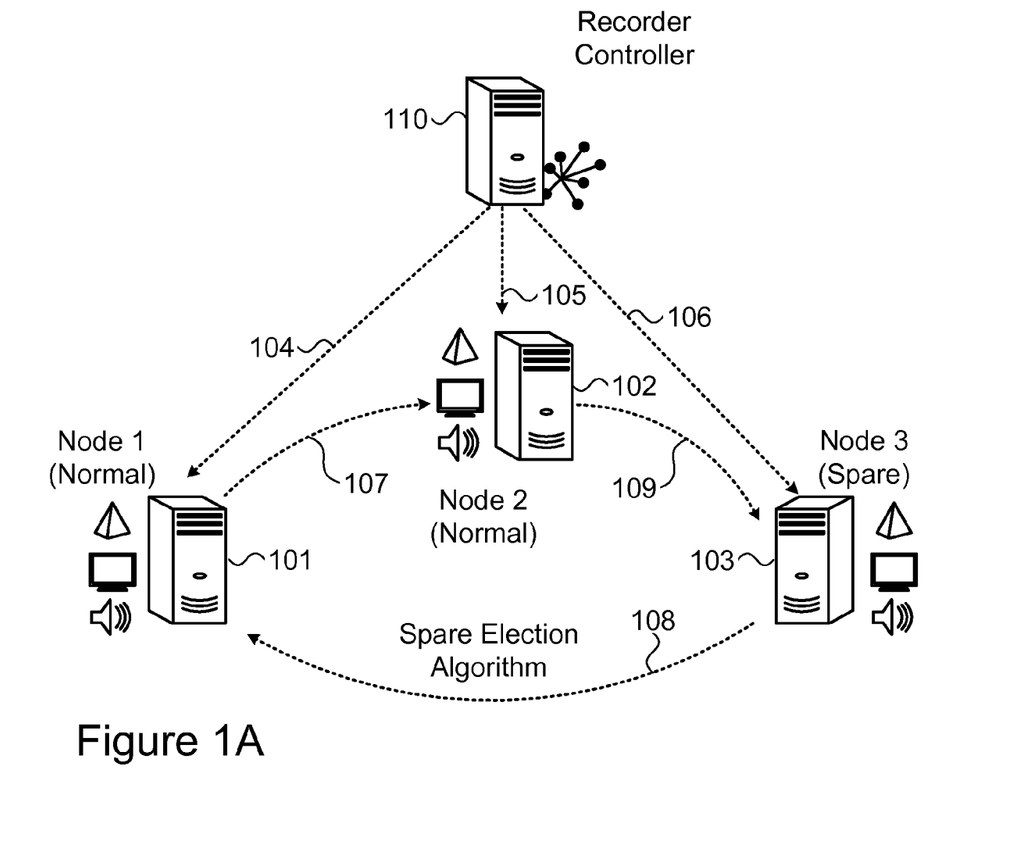
FIG. 1A is a diagram showing components of a recording system according to an embodiment of the invention.

In FIG. 1 a recording system 100 comprises a recorder controller 110 which controls recording devices 101, 102 and 103. The controller 110 and recording devices 101, 102 and 103 may communicate with each other via a communication network comprising communication links. In the example illustrated in FIG. 1 devices 101, 102 and 103 communicate with controller 110 via respective communication links 104, 105 and 106. Devices 101, 102 and 103 communicate with each other in a circle topography. Thus device 101 communicates with devices 102 and 103 via respective communication links 107 and 108 and devices 103 communicates with device 102 via communication link 109. The communication links may be wired or wireless links and may use public and/or private infrastructure such as local area networks and the internet. Each of the recording devices 101, 102 and 103 will in practice be configured to record information, e.g. in digital form. Recording devices 101 are examples of computing resources. This information may be supplied to the devices from external sources, not shown in FIG. 1, such as one or more private branch exchanges "PBX"s in a communication, e.g. telephone communications, system.

Figure 1B:
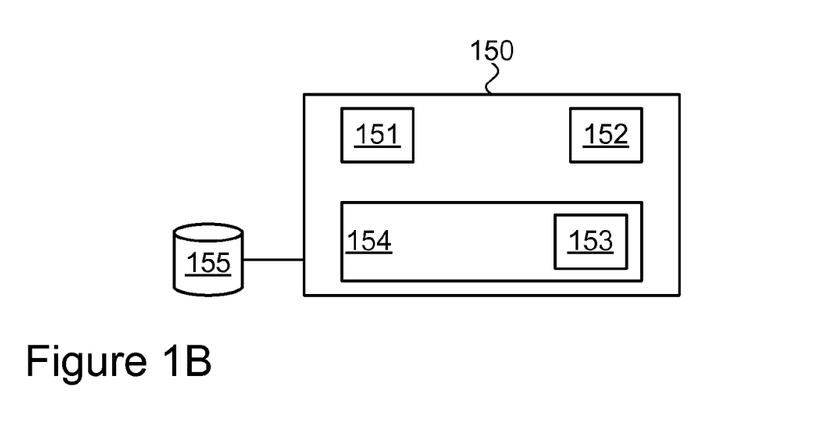
FIG. 1B is a block diagram showing the internal components of one of the system components of FIG. 1, according to an embodiment of the invention.

Each of the controller 110, and the recording devices 101, 102 and 103 may comprise software running on one or more processors in a general purpose computer. Each computer may comprise memory storing executable software as well as memory storing other data. FIG. 1B shows an exemplary computing device or computing resource (or device hosting or executing multiple computing resources) according to embodiments of the invention. cController 110, and the recording devices 101, 102 and 103 may be, or may include components similar to that of, computing device 150. Computing device 150 may include a control module 151 that may be, for example, one or more central processing unit processors (CPU), chips or any suitable computing or computational devices, an operating system 152, one or more memories 154 and storage 155. Memory 154 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 154 may be or may include a plurality of, possibly different, memory units.

Memory 154 may store executable code 153 which may be any executable code, e.g., an application, a program, a process, task or script. Executable code 153 may be executed by controller unit 151 possibly under control of operating system 152. Controller unit 151 may be configured to carry out embodiments of the invention by for example executing executable code 153.

The recording devices for example may comprise memory for storing data relating to telephone or other kinds of call. Such data may include content data such as data in audio form exchanged between parties during calls and may also include metadata relating to those calls. Recording devices 101, 102, and 103 may have one or more roles some of which are indicated by icons shown in FIG. 1. Possible roles include but are not limited to audio recording, screen recording (e.g. taking screen shots or otherwise recording text and/or images shown on a screen for example during an interaction) and archiving. The controller may act as an interaction center in a manner known in recording systems.

The arrows in FIG. 1 represent a possible flow of messages which may be exchanged between the recording devices in an embodiment of the invention to be described in more detail below. Messages may flow in both directions in some embodiments. Each recording device 101, 102, 103 comprises a node in the system of FIG. 1.

One embodiment of a method according to the invention may be termed a "spare election algorithm" as will be explained in more detail below. This method, according to one embodiment, determines which of a plurality of computing resources is to assume or take on "spare" state. Other resources for which a spare may provide backup in the event of failure may assume "normal" or "active" state. A system according to the invention may include other resources with other states. In the following, references to "state" may be taken to mean state, e.g. active or spare, for the purpose of the service or process the resource is to perform. Embodiments of the invention comprise resources configured for use within a computing system in which redundancy is provided for some resources or operations. Rather than one of the resources being designated always to be the spare, according to an embodiment of the invention all of the resources are configured such that they may act either as a spare or as a normal resource, or possibly both according to some embodiments e.g. where a resource has spare state for some functions or operations and active, or normal, state for others. Thus each resource may be configured in the same way so that it can act as spare, in which case it can be brought into use when required, for example to perform the functions of another resource that is not available for any reason. This may be achieved by configuring each resource to recognise a request to become operational or normal, for example while it is designated as the spare, in the event of a failure of another resource. It will thus be appreciated that a request to become operational or normal may be different from the normal start-up operation of an active resource.

In a system according to an embodiment of the invention, the resource that is designated to be spare, e.g. assumes or enters the spare state, could be any of the resources in the system and this may depend on the order in which the resources become available. Thus in one aspect embodiments of the invention introduce the concept of a "floating" spare. The designation of a "spare" or back up device or resource is a dynamic rather than static operation. According to some embodiments of the invention the last resource to be operational is a spare or back up resource. In such embodiments, it is ensured that normal operation is established as soon as possible, e.g. on start-up of resources, as a result of not requiring a pre-designated spare resource that could otherwise be operational before other resources in the system.

In a system in which a predetermined resource is designated to be a spare, that resource may be required to be returned to spare state as soon as the resource it is backing up (e.g. providing a potential substitute for) becomes active or operational. This can result in an interruption of service as one resource takes over the functions of another. For example in the case of recording devices this can lead to loss of data that could or should have been recorded. On the other hand, in a system in which the spare is designated in a dynamic manner, it is possible that the last resource to become operational is a spare in which case interruption of service is minimised. In a situation in which several resources are operational and one of them fails, when it returns to being able to be operational it may be designated to be a spare rather than resuming its previous functions.

A system according to some embodiments of the invention can be regarded as one in which all resources are "born equal" rather than having pre-designated functions, at least as regards certain operations or services such as the recording of data. In other words for at least one function all resources are equally able to operate as an active resource or a backup resource.

It will become clear from the following that in some embodiments the resources, e.g. machines or devices implementing a spare election procedure do not require an external server to allocate a state to them or designate one of them to be spare. The decision as to which resource will be the spare is determined between the resources and therefore the process is described in the following as spare "election". However in some embodiments resources may report to an external server or controller for other reasons.

A spare resource may monitor the operations of other resources so as to be aware when one of them fails. According to embodiments of the invention, all resources in the system, or all resources performing a particular service, may have the capability to perform this monitoring so that they can all function as a spare resource if necessary.

In the embodiment shown in FIG. 1 the controller 110 may have two roles:
  to update each node (e.g. recording device) about its chain members
  to control actual recording commands after being updated as to the state of the recording devices, e.g. after the spare election algorithm has been run. Thus for example if a spare device is brought into operation after the failure of another, the controller may instruct the previously spare device to perform the recording operations that were handled by the failed other.

The controller 110 may control other equipment in addition to the recording devices 101, 102, 103. Similarly if the recording devices comprise general purpose computers, they may all perform other functions in addition to the recording of e.g. calls and/or related metadata.

In a system according to an embodiment of the invention, any of the recording devices may take the role of spare. Therefore a method may be implemented to determine which of a plurality of recording devices is to be the spare.

As noted above, embodiments of the invention are not limited to systems comprising recording devices and may be implemented in any distributed computing system where it is desired to designate at least one as spare to be used if another fails. Therefore, in the description which follows, each of a plurality of computing resources in the system, which may be recording devices, is referred to as a node.

Figure 2:
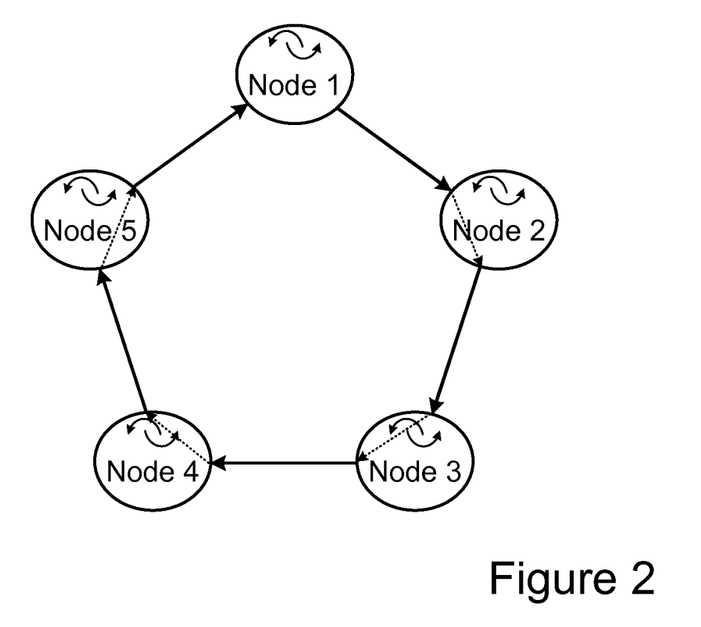
FIG. 2 is illustrates a computing system topology according to an embodiment of the invention.

FIG. 2 is a high level flow description illustrating an embodiment of a system and method for determining which of a set of five nodes should be the spare. It will be seen from FIG. 2 that according to some embodiment of the invention the signals between nodes flow from one to another in a circle topology. According to the embodiment of FIG. 2, the nodes have identities Node 1, Node 2 etc. The overall flow according to an embodiment of the invention may be summarised as follows:

Main Flow (Circle Topology)
  All nodes are arranged in a logical circle (not necessarily a physical circle)
    Uses a unique identity "ID" that is provided for each node
    The node unique ID is set during installation using standard procedures
  During node initialization each node aspires to be spare and asks for permission to be spare from its neighboring nodes
  Upon start up (or possibly at other times during its operation) each node:
    Sends a message to its direct neighbor
    This message contains a permission request to be a spare
  Each node that receives a request message decides whether to forward it to its neighbor or "cut" the messaging circle
  When a node receives back its own message (in the reverse direction around the circle)—permission is granted and it is the spare.
  The decision by a node as to whether to forward the request message or not is detailed in the following.

An embodiment in which a node sends a permission request to assume spare state is termed in the following as the "Can I be spare" method or system.

In an embodiment of the invention each service, e.g. executable file for implementation of the algorithm, may have the following data members:

| Name | Type | Description |
| --- | --- | --- |
| Neighbor | Recorder Object | A pointer to the next neighbor. For example using the above diagram, Node 3 points to Node 4 |
| My_State | Enum (NORMAL, SPARE) | My current state. During initialization node will typically be in normal mode, and after the algorithm ends it becomes either normal or spare |
| My_ID | long | My unique ID cross all nodes that are chained together |
| Safety | Critical section object | A technical object that gives the permission to read/write memory to only one thread among several different threads |
| Result | Result Object (NO_CONNECTION, NORMAL, SPARE) | A returned object for the main "Can I be spare" method. |

Some example algorithms for implementing methods according to embodiments of the invention will now be described.

In embodiments of the invention, each node is operable in two contexts (possibly in addition to other operations it might be performing):
sending a request to be a spare and awaiting the response upon start up or initiation
listening for requests from another node and forwarding or returning result.

These are abbreviated in the following to "initiating context" and "listening context". A context can be regarded as the scope within which a thread is executing code.

Figure 3:
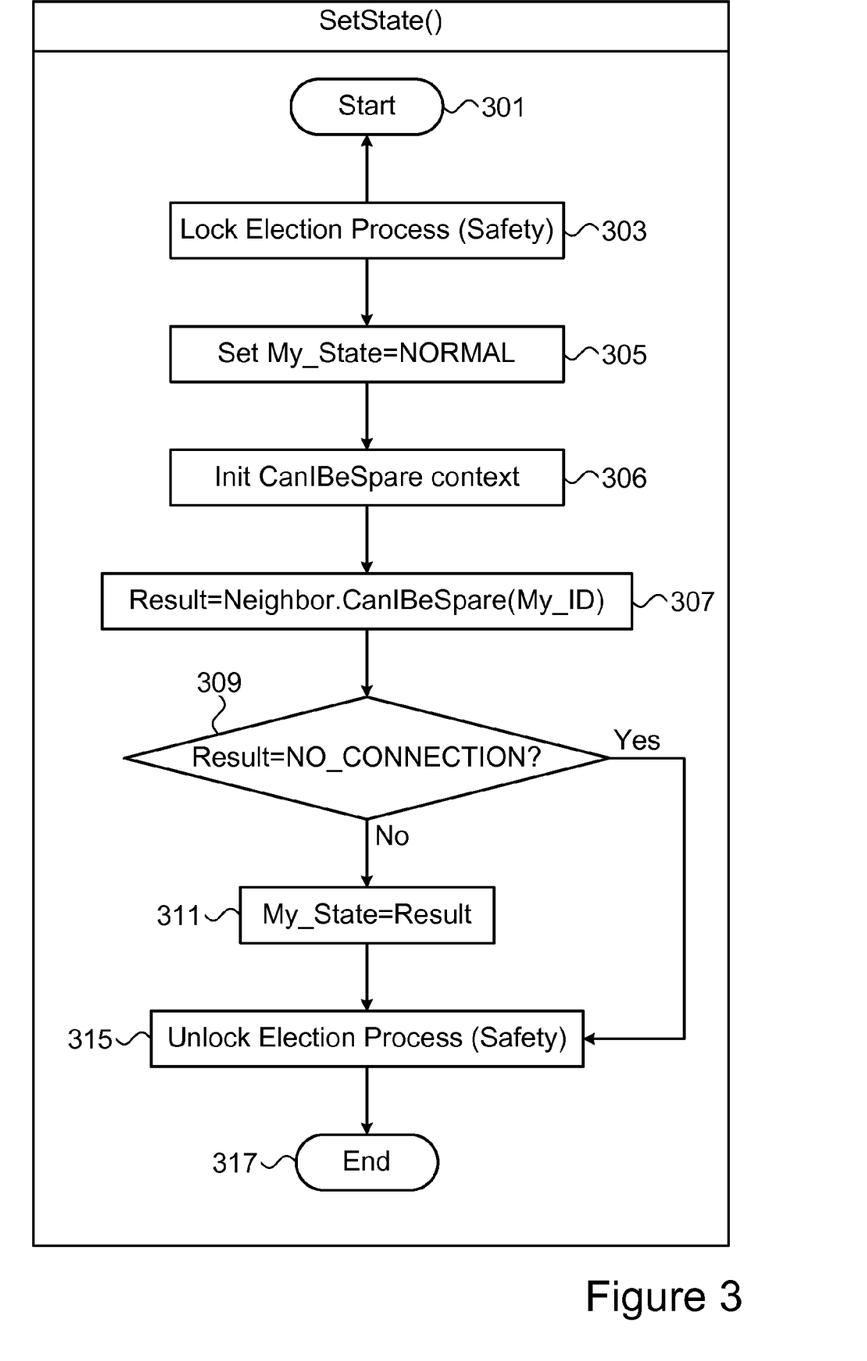
FIG. 3 is a flow chart of a process implemented by a device in initialisation context according to an embodiment of the invention.

FIG. 3 shows an example of a SetState algorithm. This algorithm is suitable to be implemented by each node in the system shown in FIG. 2 on start up in initiating context. Recall that on start-up, according to embodiments of the invention, each node aspires to be a spare. Thus each computing resource on initialization requests permission to assume spare state from the other computing resources. At the time of startup of a particular node, any of the other nodes in the system may already be operational or none of them may yet have started up. It should also be noted that on start-up, according to this embodiment of the invention, each node may know the identity of at least its neighboring node, for example this may be supplied by the controller 110.

The flow of FIG. 3 commences with start up at operation 301. At this stage the controller may provide the node with details of the other resources in the system or at least the pointer object noted above. For example the controller may provide the node with the identities of the other nodes in the system. These may be stored in memory at the node. After the node starting-up at operation 301, a "lock" is applied at operation 303. This locking of a node may lock down parameters in the data structure detailed above, except insofar as they are updated according to the subsequent operations.

Although in this embodiment all nodes are configured to request to be the spare node, the default state of all nodes in this embodiment is NORMAL, e.g. operational. Therefore at operation 305 the state of the node is set to NORMAL.

At operation 306 the listening context of the node, referred to in the following in pseudo code as the CanIBeSpare context, is initiated. Thus the node can operate listening and initializing contexts at the same time.

At operation 307 a request for permission to assume spare state is forwarded to the neighboring node using the ID of the node implementing (starting) the flow of FIG. 3. Next the result object, which will have been returned as part of a separate flow described below, is examined at operation 309. If the result object has SPARE state permission is granted. If the result object has NO_CONNECTION or NORMAL state permission to be spare is denied.

The returned result object is returned from the neighboring node if the neighboring node is active, e.g. NORMAL state. If the neighboring node cannot be reached, an internal process within the initializing node sets the returned result object to NO_CONNECTION. This internal process may be any known process by which a computing device or process responds to the absence of a reply from another device or process. Thus according to embodiments of the invention, a resource may detect or determine failure of a resource to respond to a request for permission to be spare and in response either assume active or NORMAL state if it originated the request, or send back to the requesting resource a denial of permission in the form of a NO_CONNECTION result object. A resource may determine that a resource has failed to respond for example if no response is received within a predetermined time window.

The returned result object is examined at operation 309. In the case of Node 1, if all of the other nodes are operational on startup of Node 1, the returned result object should be returned from Node 1 in the opposite direction around the circle as the following will show. As noted from the data structure above the Result can be NORMAL (e.g. operational), SPARE or NO_CONNECTION. Unless the result is NO_CONNECTION, the state of the node is updated according to the returned result at operation 311. The node is then unlocked at operation 315 so that, for example it can now listen to "Can I be spare" requests from other nodes. If the result is NO_CONNECTION the state is not changed (it remains at NORMAL as set at operation 305) and the flow proceeds to the unlocking of the node at operation 315 without any change of state.

Thus according to embodiments of the invention, if in response to a request by one resource to assume or enter the spare state one of the other resources does not grant permission, either by denial or failure to respond, the requesting resource assumes or enters the active or normal state. However if all of the other resources grant the permission, through the request propagating around the logical circle and back again, the resource assumes spare state. Thus the initializing resource requests all of the other resources for permission to be spare, either directly as in the case of the immediate neighbor or indirectly as in the case of the request being propagated on behalf of the requesting resource.

After a resource has assumed spare or normal state it reports its state to the controller 110. This may be done by a higher level algorithm that is using this spare election algorithm.

The process ends at operation 317.

The flow of FIG. 3 can be represented in pseudo code as follows (all pseudo code presented herein is example only and is non-limiting):

SetState( )
   1. Lock(Safety)
   2. My_State=NORMAL
   3. Init "CanIBeSpare(ID)" context
   4. Result=Neighbor→CanIBeSpare(My_ID)
   5. If Result !=NO_CONNECTION
     a. My_State=Result
   6. Unlock(Safety)

It is assumed that if the node is unreachable, e.g. offline or failed, the CanIBeSpare( ) method to be discussed further below returns a NO_CONNECTION result. This may be an internal process implemented at the initializing node as mentioned above.

In embodiments of the invention each node, for example both operational and spare, is configured to implement an internal service or algorithm that listens on the CanIBeSpare( ) method (code line 3 above). This method is applicable to the listening context of each node. An example of such a method is illustrated in FIGS. 4 and 5.

According to embodiments of the invention, a method may be implemented to avoid contention when two resources request initialize at the same time and hence request permission from each other to assume spare state. This may be achieved by arranging a hierarchy among resources so that if one resource receives a request for permission to be spare from another, the request will only be acted on if the resource is higher in the hierarchy than the resource receiving the request, otherwise the request will not be acted on until the resource to which the request was made has completed initialization, e.g. assumed spare or active state. The hierarchy may be readily achieved using identities already given to the resources. For example certain kinds of resources have identities hard coded into memory. These may be numerical or alpha numerical or otherwise readily organized into an order or hierarchy. One possible method for implementing this hierarchy is illustrated in the flow of FIG. 4.

Figure 4:
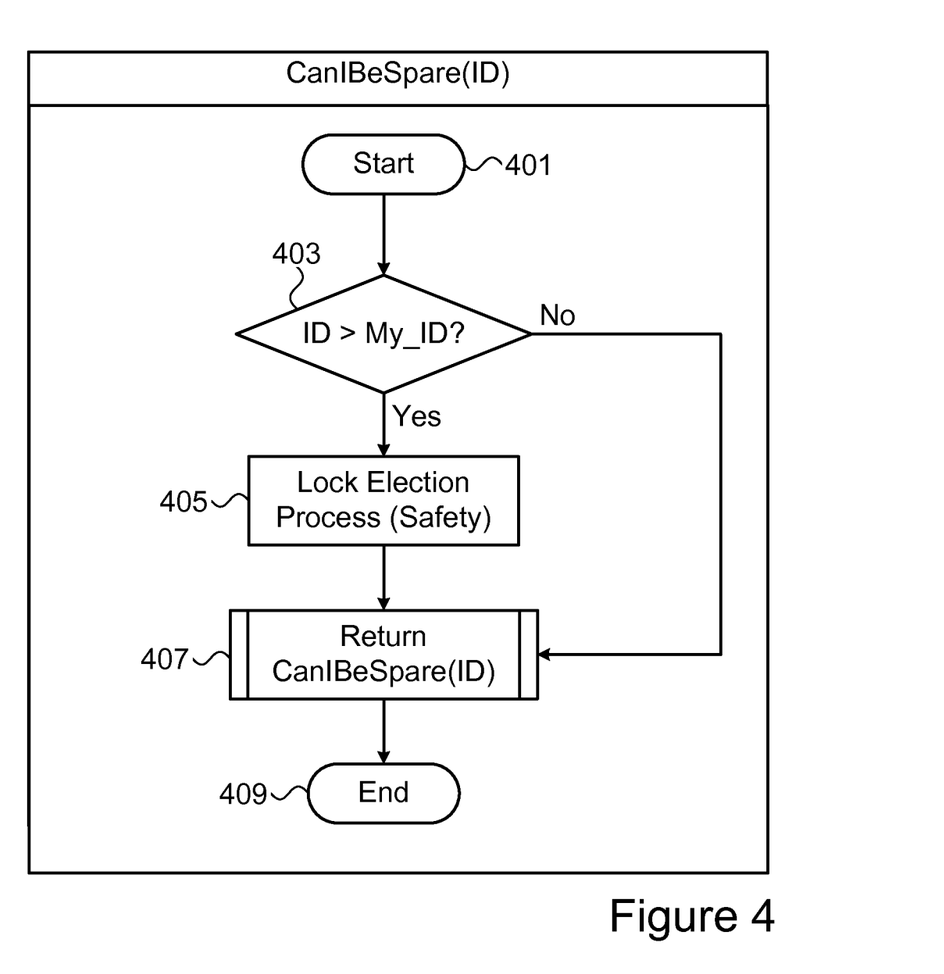
FIG. 4 is a flow chart of part of a process implemented by a device on receipt of a request for permission to assume spare state according to an embodiment of the invention.
Figure 5:
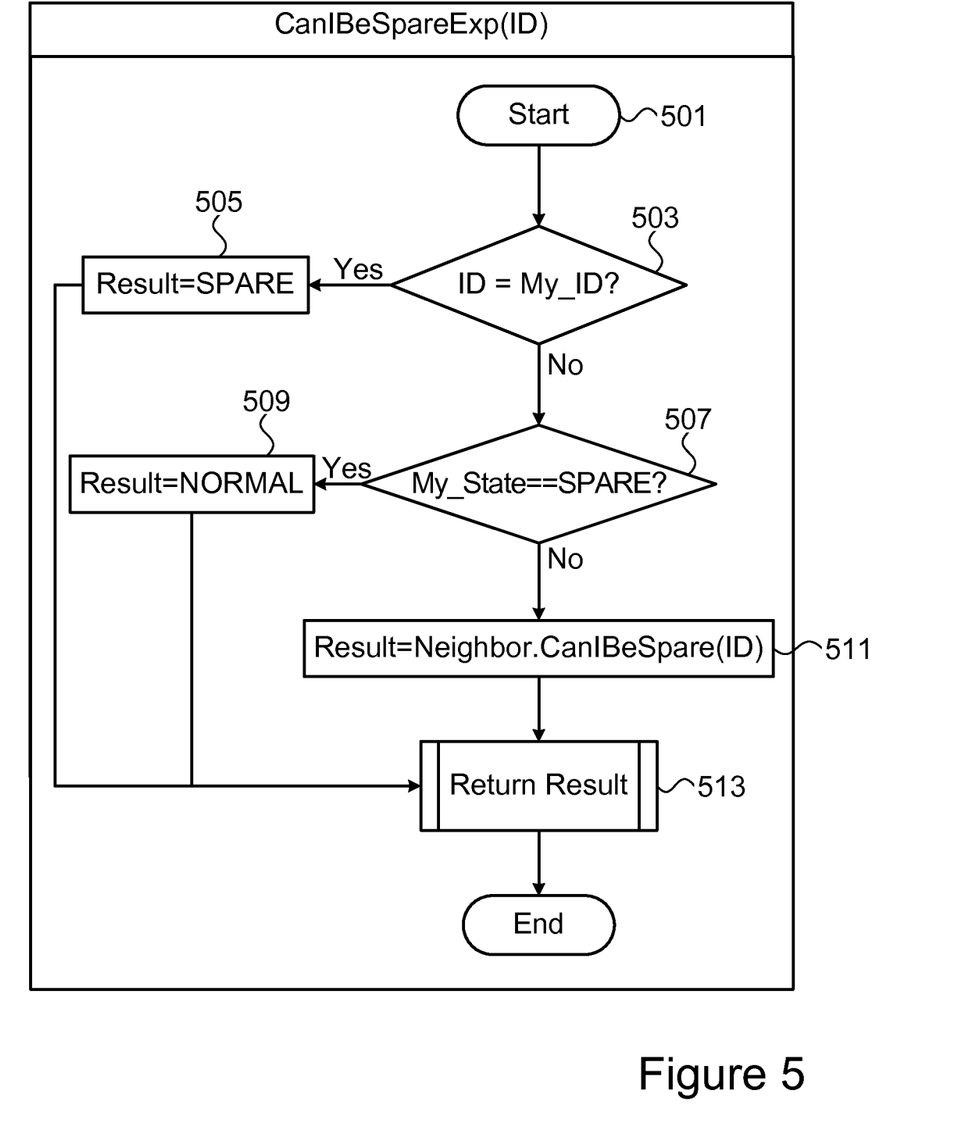
FIG. 5 is a flow chart of another part of a process implemented by a device on receipt of a request for permission to assume spare state according to an embodiment of the invention.

In FIG. 4, following the start-up operation 401, an incoming request is examined at operation 403 to determine whether the ID of the requesting or sending node is larger than the ID of the receiving node. If yes, for example Node 5 is sending a request to Node 1, and if the same node is also in initialization context, e.g. implementing one of operations 303 to 315, the election process is temporarily locked at operation 405. As a result there is a pause or wait in the flow before the locking operation 405 ends and the flow proceeds to operation 407. Being in this pause means the node is in initialization context, e.g. locked as part of the flow of FIG. 3, and if so the pause continues until the node is unlocked at operation 315, and the flow proceeds to operation 407. If the node has unlocked initialization context at operation 315 the lock operation 405 of the listening context may not be implemented. Thus according to some embodiments, for an actual pause to take place both lock operations 303 in initialization context and 405 in listening context are called or implemented. If the ID of the sending node is not larger than the ID of the receiving node, the process continues to operation 407 without pausing. It will be seen that operation 403 in effect establishes a hierarchy between competing nodes which helps to avoid the possibility of deadlock which may arise for example, if each node requests the other for permission to be spare at the same time. This is described further below and is referred to as a one way lock. The "one way" does not refer to the direction around the circle but simply an order of preference between two nodes.

Operation 407 is a return result routine according to which the result is returned to the higher method that called for it, in this case the SetState flow of FIG. 3. An example implementation of operation 407 is shown in FIG. 5.

The process shown in the flow of FIG. 4 can be regarded as implementing a one way lock. If two nodes request to be spare simultaneously the request from the node with the lowest ID is handled first. In the flow of FIG. 2, if nodes 1 and 5 both request to be spare at the same time, node 5 will process a request from node 1 because it has a lower ID but node 1 will not process a request from node 5 until it has completed its own initialization.

It will be appreciated from the foregoing that according to embodiments of the invention, a node sends messages requesting to be the spare in one direction only around the circle topology, e.g. a designated next neighbor in one direction only. Similarly in such embodiments a node may change its state only in response to messages from one direction only, e.g. a designated next neighbor, e.g. in the other direction around the circle topology.

In particular, deadlock may result if requests are allowed to propagate in both directions around the circle topography.

The flow of FIG. 4 can be summarized in pseudo code as follows:

CanIBeSpare(ID)
    7. If (ID>My_ID) //The concept of "One Way Lock"
       a. Wait(Safety)
    8. Return CanIBeSpareExp( )

An example of a suitable CanIBeSpareExp algorithm is illustrated in FIG. 5.

The method commences with start up at operation 501, following which an incoming request is examined at 503 to determine its origin. If it is determined that the request originated from the receiving node in initialization context e.g. the ID is the ID of the receiving node, permission to be assume spare state can be granted in which case the request may be responded to with permission to assume spare state. In order to achieve this, at operation 505 the result object, to be returned to the sending node, is set to be spare and returned to the node from which the request was received. In this way the result object is propagated around the circle in the reverse direction from one node to the next until it is received by the node in initialization context according to the flow of FIG. 3 and used to determine the state of the node that initiated the request.

If it is determined at operation 503 that the ID of the incoming request (which will be the ID of the node that initiated the request) is not the ID of the receiving node and therefore the request originated at another resource, then it is determined at operation 507 whether the current state of the listening node, My_State, has been set to SPARE. If the listening resource is in spare state, it is not available to the initializing resource and therefore the RESULT object is set to NORMAL at operation 509. If that is the case the flow continues to operation 513 where the result is returned to the initializing node. There is no need for the request to be propagated further around the circle since it is already determined that the initializing node must be active or have NORMAL state.

If it is determined at operation 507 that My_State is not SPARE, i.e. it is NORMAL, the flow continues to operation 511 where the request to be spare is forwarded to the neighboring node in a similar manner to operation 307 of FIG. 3. Note however that at this point the ID used in the request is not the ID of the sending node but the ID of the node that originated the request.

At operation 513, a Return Result operation is carried out, similar to operation 407, in which a result is returned to a higher flow or process, in this case the flow of FIG. 4. Here the result is returned to the sending node which is implementing the flow of FIG. 4 and therefore receives the result at operation 407 which called the flow of FIG. 5. This result is either received from a forward neighboring node that has implemented the flow of FIG. 5 or it is the result determined at operation 505 or 509 described above. This process may continue until the result is returned to an originating node. Thus after forwarding the request for permission to be spare to the next node in the circle, a node returns the response to the node from which the request was received. Since if all the other nodes are active the request and response propagate around the whole circle, the nodes closest to the originating node wait longest for a response.

The process of FIG. 5 ends at operation 515.

The flow of FIG. 5 can be represented in pseudo code for example as follows:
    9. If ID==My_ID
       a. Return SPARE //Closing the circle
    10. If My_State==SPARE
       b. Return NORMAL //Cutting the circle
    11. Return NeighborCanIBeSpare (ID) //(if no connection will be set to NORMAL any way)

Example

Assume there are three machines in the system:
    A1 (ID=1)
    A2 (ID=2)
    A3 (ID=3)
Based on the above IDs, the logical circle is:
A1→A2→A3→A1→A2 . . .
and messages may flow:
A1→A2→A3→A1 and back or
A2→A3→A1→A2 and back . . .
depending on where the flow commences.

Consider the following scenario (the references to "lines" in the following refer to the pseudo code above):
    1. A1 and A2 start up together, while A3 is still down.
       a. A1 and A2 in initiating context call SetState (flow of FIG. 3) while both in state "NORMAL"
       b. A1 and A2 initiate the Safety lock (line 1, FIG. 3 operation 303)
       c. A1 in initiating context executes line 3, meaning A1 calls A2→CanIBeSpare(1) (FIG. 3 operation 307)

d. Inside A2 in listening context the CanIBeSpare(1) flow of FIGS. 4 and 5 is carried out. Here A1 is not locked out in line 7 since its ID is <A2 ID (FIG. 4 operation 405)

e. On behalf of this call from A1, A2 tries to reach its neighbor A3 (FIG. 5 operation 511) but fails (since A3 is not up yet)

f. Since A3 is unreachable, a process within A2 returns a NO_CONNECTION result. A2 returns this NO-CONNECTION result to A1 (FIG. 5 sub-routine 513).

g. Back to A1 initializing context, A2 returns the NO_CONNECTION result to A1, and A1 operating the flow of FIG. 3 receives this result and examines it (line 3 and FIG. 3 operation 309)

h. A1 stays with My_State unchanged (NORMAL) (FIG. 3 operation 309, NO route to operation 315)

i. On the other hand, A2 in initializing context calling SetState will try to reach its neighbor (line 3 FIG. 3 operation 309). Since the neighbor A3 is not available the process within A2 returns NO_CONNECTION and therefore the state of A2 becomes NORMAL (lines 3-5 FIG. 3 operations 300, 315) j. Both A1 and A2 set their state to NORMAL, and their Safety lock is released (FIG. 3, operation 315).

2. Then, A3 starts up and calls SetState a. A3 in initiating context calls forward neighbor A1 CanIBeSpare(3) (line 3 FIG. 3 operation 307)

b. A1 is in a NORMAL state, then it calls A2 CanIBeSpare(3) (line 11 FIG. 5 operation 511)
  i. A1 does not lock A3 since its Safety lock is off (FIG. 3 operation 315)

c. A2 is in NORMAL state, then it calls A3 CanIBeSpare (3) (line 11 FIG. 5 operation 511) on behalf of A3
  i. A2 doesn't lock the call coming from A1 on behalf of A3, since its Safety lock is off (FIG. 3 operation 315)

d. A3 in listening context recognizes itself and returns SPARE (line 8 FIG. 5 operation 505)

e. The SPARE is returned from A3 (operation 513 by A3) up back to the node A2 f. A2 returns the SPARE back to A1 (operation 513 by A2)

g. A1 returns the SPARE back to A3 (operation 513 by A1)

h. A3 declares itself as SPARE (line 5.a) (operation 311 by A3)

Note that if A3 and A1 started at the same time, instead of A1 and A2 in the above example, this would result in A3 calling A1 and therefore in operation 1.d of the above example A3 would be locked until A1 had performed operation 1.i and assumed NORMAL state.

After all machines or computing resources are up and running, they have assumed the following states:
A1=NORMAL
A2=NORMAL
A3=SPARE It will be appreciated from the foregoing that in this embodiment the last machine to become operational is the one that becomes the spare.

If a resource, e.g. node or device, or a process on a node or a device, becomes inactive for any reason during the operation of the system, the node that is in spare state will become operational in a manner known in the art.

Embodiments of the invention operate such that each machine or device that starts up runs the spare allocation algorithm and receives or determines its state from a response from one or more other devices. At this time any of the other machines or devices in an embodiment of system according to the invention may be up (active) or down, e.g. failed or not yet initialized.

The use of IDs, which may be predetermined, in embodiments of the invention, helps to avoid failures in allocating states to resources. For example, in embodiments where a debate between two nodes is determined from the resource ID this avoids possible problems that might arise from two resources attempting to determine their state at the same time. In the above example using a circular topography the "lowest ID wins" approach is used but it will be appreciated that "highest ID wins" is equally suitable.

Embodiments of the invention introduce the concept of a "one way lock" where, in the case of a debate or contention between two nodes, one node waits on the other. In the above example the one that waits is the one with the highest ID. This example is suitable where the ID has a numerical value. The lowest ID could equally well take priority. Any hierarchy between nodes cane be used that is suitable for determining which of two nodes has priority over the other for the purpose of determining the state of a node.

Figure 6A:
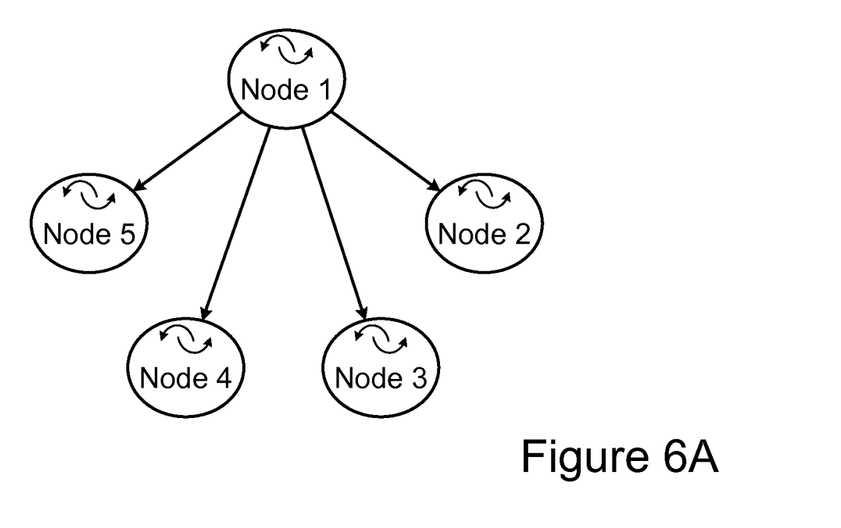
FIGS. 6A and 6B illustrate an alternative computing system topology according to an embodiment of the invention.
Figure 6B:
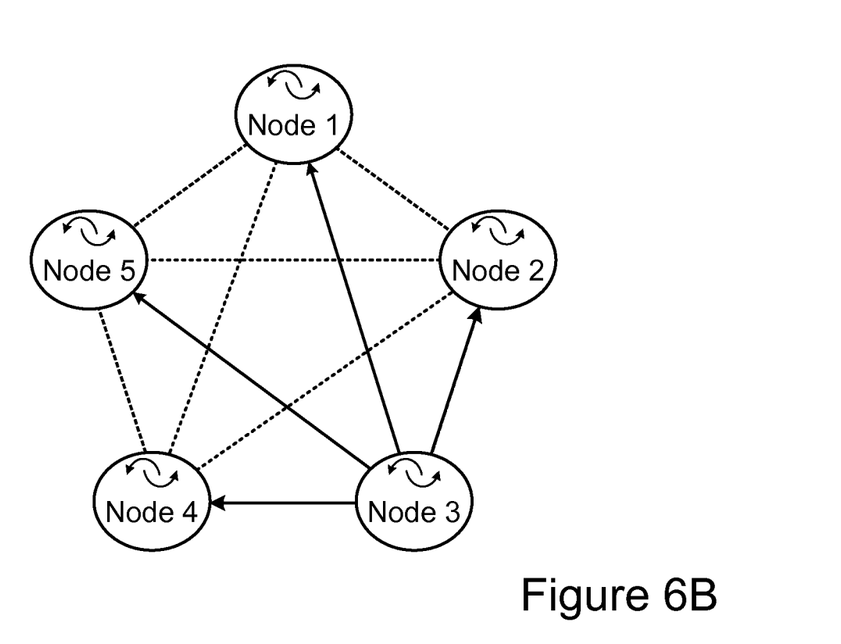

Alternative Flow (Star Topology):

FIGS. 6A and 6B are high level flows illustrating another embodiment of a system and method for determining which of a set of five nodes should be the spare. The nodes may have the same roles and be constructed in the same manner as the nodes shown in FIG. 1. The nodes of FIGS. 6A and 6B may all communicate with a controller, such as the recorder controller 110 of FIG. 1. The nodes may communicate with the controller in the same way as the nodes shown in FIG. 1 but they may communicate with each other in a different manner from that shown in FIGS. 1 and 2.

It will be seen from FIGS. 6A and 6B that according to some embodiments of the invention the signals between nodes may flow from one to another in a star topology. In some embodiments implementing the star topology each node is designated to send and receive requests to all other nodes rather than only its neighbour. According to this embodiment, the nodes have identities Node 1, Node 2 etc. The overall flow according to the embodiment of the invention illustrated in FIGS. 6(a) and 6(b) may be summarised as follows:

Upon startup each node performs the following:
  Asks all other members (at the start) if it can be the spare
  If all returned "Yes" it becomes spare, otherwise/unavailable it is normal According to embodiments of the invention using the star topology, in one possible mode of implementation each node is operable in two contexts (possibly in addition to other operations it might be performing):
sending a request to be a spare and awaiting the response upon start up or initiation
listening for requests from another node and forwarding or returning result.

Again these are abbreviated in the following to "initiating context" and "listening context".

In the star topography, according to some embodiments, each node knows the identities of all the other nodes and can approach them all. The exact topography will depend on which of the nodes is determining whether it can be the spare. FIG. 6(a) shows a topography according to which Node 1 can request to be the spare. FIG. 6(b) shows in solid lines a topography according to which Node 3 can request to be the spare. It will be appreciated that for this embodiment of the invention each of the nodes in the system may be connected to each of the others, in some embodiments directly connected, whereby each node can ask each other node whether it can be the spare without the intervention of another node. FIG. 6(b) shows in dotted lines direct connections between all of the remaining nodes. By providing connections between each node and each of the other nodes in the system it is possible to configure the nodes of FIG. 6(b) with any of the nodes being at the "centre" of the star, or the node from or to which all communications are sent.

In embodiments of the invention if any node is unreachable for example because it has failed or is off line then the initiating/requesting node adopts normal state. Thus, in such embodiments, as with embodiments of the circle topology and other possible embodiments, only the last node to become operational adopts spare state.

In an embodiment of the invention using the star topology each service, e.g. executable file for implementation of the algorithm, may have the following data members:

| Name | Type | Description |
|---|---|---|
| Neighbors | List of Recorder Objects | A list of my neighbors. For example using the above diagram, Node 3 will have a list of Nodes 1, 2, 4 and 5. |
| neighbor | A pointer to an object | A pointer to one object inside Neighbors |
| My_State | Enum (Pending, NORMAL, SPARE) | My current state. During initialization node will typically be in normal mode, and after the algorithm ends it becomes to be either normal or spare |
| My_ID | long | My unique ID cross all nodes that are chained together |
| Safety | Critical section object | A technical object that gives the permission to read/write memory to only one thread among several different threads |
| Result | Result Object (NO_CONNECTION, NORMAL, SPARE) | A returned object for the main "Can I be spare" method. |

Initiating Context—Set State

According to embodiments of the invention, as with the circle topology described above and other possible topologies, each node may upon start up implement a method to determine its state. This determines one possible context in which a node may operate termed the initiating context in the following. In another possible context termed the listening context a node receives a request to become the spare node.

Figure 7:
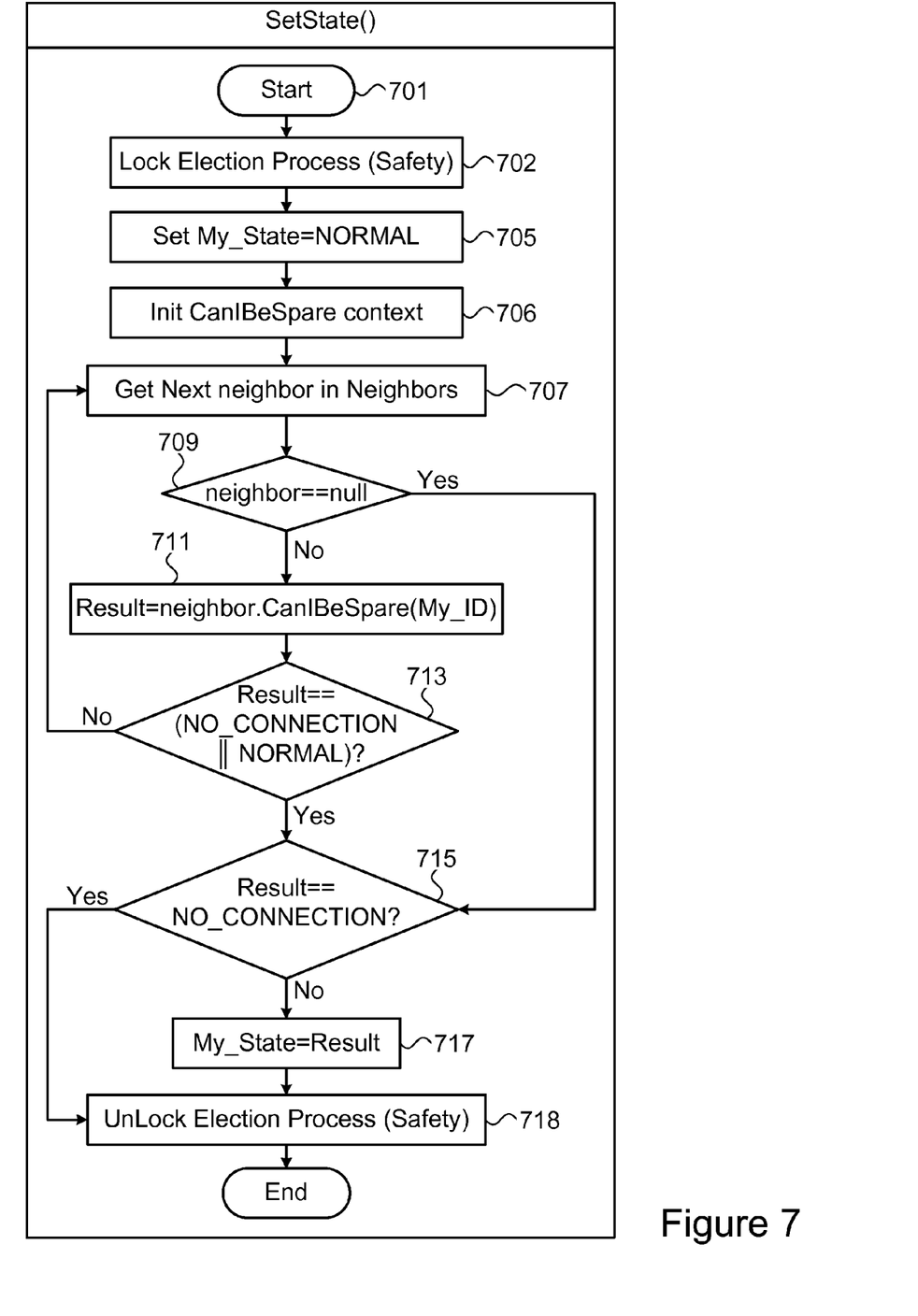
FIG. 7 is a flow chart of an alternative process implemented by a device in initialisation context according to an embodiment of the invention.

One embodiment of a method implemented at a node to determine its state, for example in listening context, is illustrated in FIG. 7. According to the embodiment of FIG. 7, upon start up a node calls a SetState( ) algorithm to determine its state.

The flow of FIG. 7 begins with a start operation 701. At this stage the controller 110 may supply to the node the list of Neighbor objects in a similar manner to the start operation described with reference to FIG. 3. This start operation is followed by a lock election operation 702. This operation is performed for safety and ensures that the node cannot receive requests to become spare before it has determined its own state. It may be performed in the same manner and have the same function as the operation 303 of FIG. 3.

At operation 705 the state of the node is set to NORMAL. In this embodiment as with some of the previously described embodiments, the default state of each node is NORMAL.

At operation 706, the CanIBeSpare context is initialized in a similar manner to operation 306 of FIG. 3.

The node may have a list of the other nodes in the system in which this spare election process is being used, for example in memory, and may work through the list in querying each other node in order to determine whether it can be the spare. The list may be supplied to the node by the controller. Provided that all of the other nodes in the list are consulted if necessary, they may be consulted in any order. Thus, according to the flow of FIG. 7, commencing at operation 707 the node performs a set of operations which may be repeated for each neighbor in Neighbors (list of neighbors). In this way a node sends a request directly to each of its neighbors for permission to assume spare state.

At operation 707 the next (or first) neighbor object is selected using the neighbor pointer. The pointer is examined at operation 709. It may be null indicating that there are no more nodes to which requests should be sent, i.e. the whole list of Neighbors has been consulted, in which case the flow proceeds to operation 715 described further below.

If the next neighbor is not null the flow proceeds to operation 711 where a request is sent to the node to which the neighbor object is pointing to determine whether the initializing node can be the spare. The result returned from the request is examined at operation 713.

As with other embodiments such as that described with reference to FIG. 3, in this embodiment grant or denial of permission to assume spare state is determined from the state of the result object. According to some embodiments implementing the star topology, result objects from each other node, rather than for example only one neighboring node, are examined in order to determine whether a node has permission to assume spare state.

As indicated in the table above, according to this embodiment of the invention, the Result object can have values NO_CONNECTION, NORMAL or SPARE. The NORMAL or SPARE values may be returned by the node to which the request was sent. The NO_CONNECTION value is determined by the initiating node when there is no response from the node to which the request was sent. The Result object indicates the state permitted to the initializing node by the listening node. If a Result object returned to a node is SPARE, a node can only assume spare state if all nodes return a SPARE result. Conversely if one result object is NORMAL or NO_CONNECTION the node to which it is returned assumes NORMAL state without sending requests to other nodes.

Thus at operation 713, if the Result of the request to be spare is not NO_CONNECTION or NORMAL, e.g. SPARE, the flow will revert to operation 707 where the next neighbor object is selected. This continues until a request has been sent to all of the neighboring nodes since a node can only become spare if all of the others permit it to do so.

If the result of the request to be spare is NO_CONNECTION or NORMAL there is no need to send a request to any of the other nodes. A NORMAL result is possible for example if a node initiates the algorithm again for any reason when there is already a spare. Therefore the flow continues to operation 715 where the result is examined further. If the result is NO_CONNECTION, the flow continues to operation 718 where the node is unlocked following which the flow ends at operation 720. The state of the node remains NORMAL as set in operation 705. If the result is NORMAL, the flow proceeds to operation 717 where the state of the node is set to be whatever the result of the request was—NORMAL or spare. The node is then unlocked at operation 718 and the flow ends at operation 720.

The flow of FIG. 7 can be represented in pseudo code as follows:

SetState( )
  1. Lock(Safety)
  2. My_State=NORMAL

3. For each neighbor in Neighbors
   a. Result=neighbor→CanIBeSpare(My_ID)
   b. If Result==NO_CONNECTION||(or) Result==NORMAL
      i. Break
4. If Result !=(≠) NO_CONNECTION
   a. My_State=Result
5. Unlock(Safety)

NOTE:

Assume that if node is unreachable the CanIBeSpare( ) returns NO_CONNECTION

Figure 8:
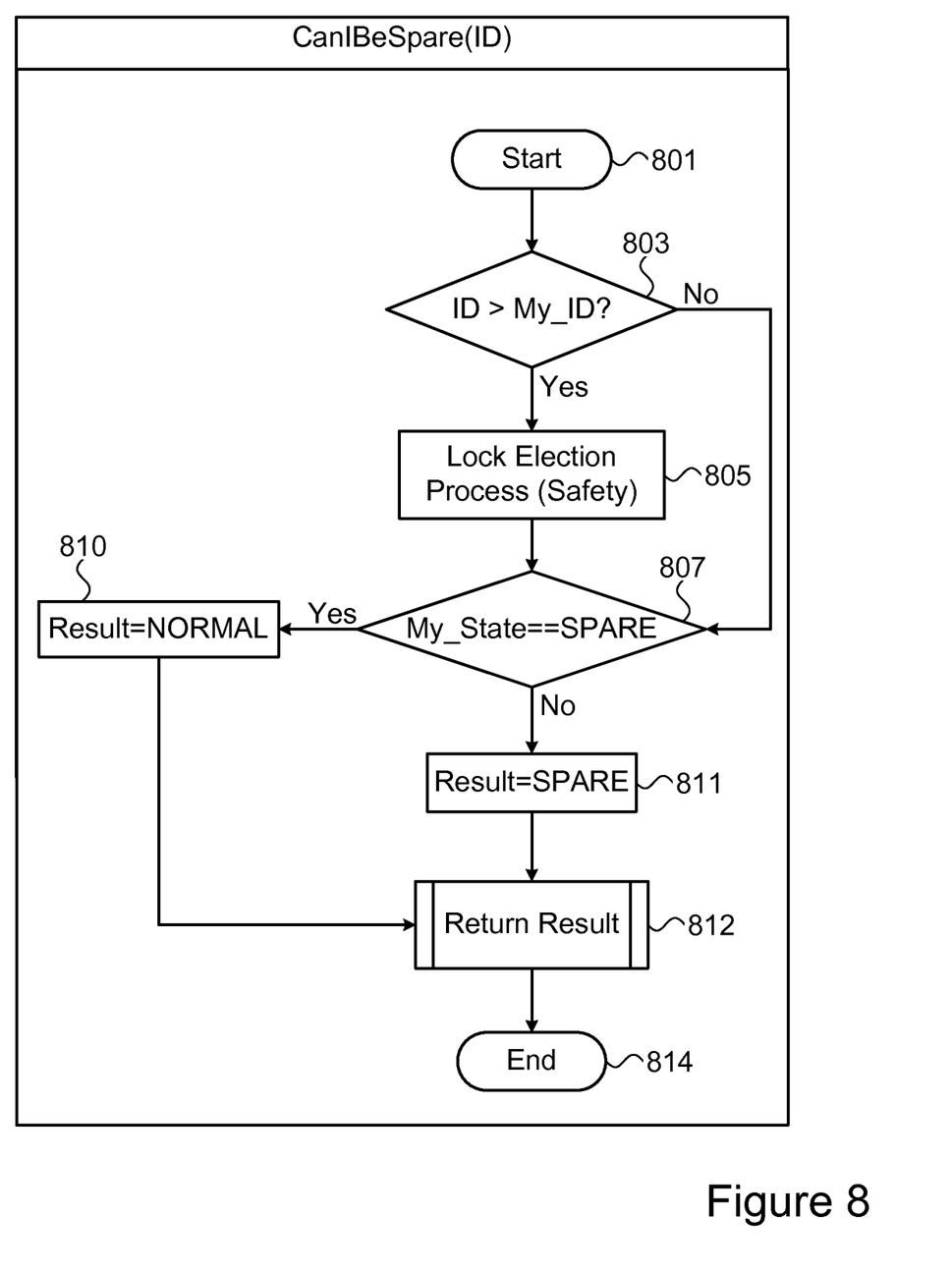
FIG. 8 is a flow chart of an alternative process implemented by a device on receipt of a request for permission to assume spare state according to an embodiment of the invention.

According to embodiments of the invention, in listening context a node may implement the flow shown in FIG. 8 in which a request to be spare is accepted or denied on the part of one node. As noted above according to embodiments of the invention all nodes should accept a request to be spare from another node before that other node becomes the spare.

According to embodiments using the flow of FIG. 8, the first operation 801 is start up after which the node is ready to examine a request to be spare. A request to be spare is then examined at operation 803. At this stage in the flow the ID of the requesting party is determined to ascertain whether it is larger or smaller than the ID of the listening node and if so, e.g. the determination ID>MyID is positive, the spare election process is locked for a wait period at operation 805. At this stage it is determined whether the listening node is also in the process of initialization and if so the flow pauses until the node is unlocked at operation 718.

Next at operation 807 the state of the listening mode is queried. If it is spare, for example because a node in NORMAL state has initiated the algorithm again for any reason, the requesting node cannot be the spare and therefore the result object to be returned to the requesting node is set to be NORMAL at operation 810. This result is returned to the requesting node at operation 812 and the process ends at operation 814.

If the listening node is not in spare state, then it may be possible for the initiating node to become spare in which case the Result object to be returned to the initiating node is set to SPARE. This result is sent back to the initiating node at operation 812. The process ends at operation 814.

An embodiment of a process implemented in a node in listening context can be represented in pseudo code as follows, which is an example only and which is non-limiting:
CanIBeSpare(ID)
5. If (ID>My_ID) //The concept of "One Way Lock"
   a. Wait(Safety)
6. If My_State==SPARE
   a. Return NORMAL
7. Else return SPARE Example Assume we have 3 machines in the system:
A1 (ID=1)
A2 (ID=2)
A3 (ID=3)
Consider the following scenario (line numbers refer to the pseudo code above):
3. A1 and A2 start up together, while A3 is still down.
   a. A1 and A2 call SetState while both in state "NORMAL" (flow of FIG. 7)
   b. A1 and A2 initiate the Safety lock (line 1) (FIG. 7 operation 703)
   c. A1 executes line 3a, meaning calls A2→CanIBeSpare(1) (FIG. 7 operation 711)
   d. Inside A2 listening context (flow of FIG. 8), A1 is not being locked in line 6 since its ID is <A2 ID (FIG. 8 operation 803)
   e. A2 in line 8 returns to A1 the value SPARE (FIG. 8 operations 811, 812)
   f. A1 executes again line 3a, meaning calls A3→CanIBeSpare(1) (FIG. 7 loop from 713 to 707)
   g. Since A3 is unreachable, the internal process within A1 method returns NO_CONNECTION
   h. Due to A3 being unreachable, A1 leaves the loop in 3b and remains with original NORMAL state (FIG. 7 operation 715 NO path)
   i. A1 releases the Safety lock (FIG. 7 operation 718).
   j. It is possible that at the same time, A2 executes line 3a, meaning calls A1→CanIBeSpare(2) (FIG. 7 operation 711)
   k. Inside A1 listening context (flow of FIG. 8), A2 is locked in line 6 since its ID is >A1 ID (FIG. 8 line 803).
   l. This lock will be released only when A1 has completed the flow of FIG. 7 which may involve sending requests to all nodes.
   m. Once node A1 releases the lock (FIG. 7 operation 718), it is set at NORMAL (FIG. 7 operation 715 NO path) then it returns to A2 SPARE (line 8) (FIG. 8 operations 811, 812)
   n. A2 executes again line 3a, meaning calls A3→CanIBeSpare(2) (FIG. 7 loop from 713 to 707)
   o. Since A3 is unreachable, the method returns NO_CONNECTION
   p. Due to A3 being unreachable, A2 leaves the loop in 3b and remains with original NORMAL state (FIG. 7 operation 715 NO path)
   q. A2 releases the Safety lock (FIG. 7 operation 718)
4. Then, A3 starts up and call SetState
   a. A3 executes line 3a, meaning calls A1→CanIBeSpare (3) (FIG. 7 operation 711)
   b. A1 is in a NORMAL state, thus returns SPARE (line 8) (FIG. 8 operations 811, 812)
      i. The Result value from A1 is equal to SPARE
      ii. A1 doesn't lock A3, since its Safety lock is off (FIG. 8 line 805)
   c. A3 executes again line 3a, meaning calls A2→CanIBeSpare( )
   d. A2 is in a NORMAL state, thus returns SPARE (line 8) (FIG. 8 operations 811, 812)
      i. A2 Result value equals SPARE
      ii. A2 doesn't lock A1, since its Safety lock is off (FIG. 8 line 805) e. A3 leaves the loop (end to cover all nodes) and sets its new state to be Result (line 4a), in other words, it is the SPARE.

After all machines are up and running, the nodes are in the following states:
A1=NORMAL
A2=NORMAL
A3=SPARE It should be noted that the state assumed by a resource according to embodiments of this invention may apply to one operation only of multiple operations performed by the resources. This may be an operation that is performed by all of the resources when in active or normal state. Recording is just one example of such an operation. A spare state for any operation may simply mean that the device is not performing that operation but is available to do so if required. It is also possible according to embodiments of this invention that the state assumed by a resource applies to multiple operations performed by the resource whist the resource is performing one or more other operations to which the state is not applicable. The devices may in addition perform other operations which may be different from each other. One or more of the one or more operations to which the active/spare state is applicable may be a recording operation.

Embodiments of the invention are not limited to the allocation of spare or normal state to computing resources. Embodiments of the invention are applicable to any computing system in which only one of multiple computing resources may adopt a particular state. This may be termed the "last to be operational" state and would take the place of "spare" state in the above embodiments. Embodiments are not limited to systems using the specific terms "spare" and "normal"; other terms may be used to describe the state or operations of components of embodiments of the invention.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Thus an embodiment of the invention may take the form of one or more computer readable media, for example non-transitory media or non-transitory computer-readable media, comprising or storing thereon instructions which when executed on one or more processors in a computing system cause the system to implement any of the methods described herein.

The aforementioned flowcharts and diagrams illustrate the architecture, functionality, and operation of possible implementations of systems and methods according to various embodiments of the present invention. In this regard, each block in the flowchart or item in the diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, operations or integers or groups thereof and that the terms are to be construed as specifying components, features, steps, operations or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable although flow diagrams may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method implemented in a first computing resource comprising one of multiple computing resources in a computing system, the method comprising:
   sending to the multiple computing resources in the computing system other than the first computing resource a request for permission to assume spare state,
   if all the multiple computing resources other than the first computing resource grant the permission, assuming spare state, and
   if any of the multiple computing resources does not grant the permission, assuming normal state, wherein each of the multiple computing resources has a unique identity whereby the multiple computing resources are organized in a hierarchy, and the method further comprises:

receiving a request to assume spare state from one of the multiple resources in the system other than the first resource;

determining whether the resource from which the request was received is lower in the hierarchy than the first resource;

if the resource from which the request was received is lower in the hierarchy, delaying responding to the request until the first resource has assumed spare or normal state; and if the resource from which the request was received is higher in the hierarchy, responding to the request.

2. The method as claimed in claim 1 in which the first computing resource is configured to communicate with the other resources in the system in a logical circle and further comprising:

receiving a request from or via a neighboring resource in the logical circle for permission to assume spare state, determining that the request originated at the first resource, and responding to the request with permission to assume spare state.

3. The method as claimed in claim 1 in which the first computing resource is configured to communicate with the other ones of the multiple computing resources in the system in the manner of a logical circle and further comprising:

receiving a request from or via a neighboring one of the multiple computing resources in the logical circle for permission to assume spare state, determining that the request originated at one of the multiple computing resources other than the first resource, and forwarding the request to the next one of the multiple computing resources in the logical circle.

4. The method as claimed in claim 3 further comprising:

receiving a response from the next one of the multiple computing resources and returning the response to the one of the multiple computing resources from or via which the request was received.

5. The method as claimed in claim 3 further comprising determining that the first computing resource has not assumed spare state prior to said forwarding the request to the next one of the multiple computing resources in the circle.

6. The method as claimed in claim 1 comprising sending the request for permission to assume spare state to each of the multiple computing resources in the system other than the first computing resource.

7. The method as claimed in claim 1 comprising determining failure of one of the multiple computing resources to respond to a request from the first resource for permission to assume normal state, and assuming normal state in response to said determining.

8. The method as claimed in claim 4 comprising determining failure of the next one of the multiple computing resources to respond to the request and in response to said determining returning to the one of the multiple computing resources, from or via which the request was received, a denial of permission to assume spare state.

9. The method as claimed in claim 1 comprising determining grant or denial of permission to assume spare state from the state of a result object returned from one or more of the multiple computing resources other than the first resource.

10. The method as claimed in claim 1 in which the spare state applies to at least one operation capable of being performed by all of the multiple computing resources.

11. The method as claimed in claim 10 in which the operation is a recording operation.

* * * * *